(12) United States Patent
Ramin (10) Patent No.: US 11,987,871 B2
(45) Date of Patent: May 21, 2024

(54) ELECTRODES FOR LASER CHAMBERS HAVING EXTENDED LIFETIME

(71) Applicant: Cymer, LLC, San Diego, CA (US)

(72) Inventor: Leyla Ramin, San Diego, CA (US)

(73) Assignee: Cymer, LLC, San Diego, CA (US)

( * ) Notice: Subject to any disclaimer, the term of this patent is extended or adjusted under 35 U.S.C. 154(b) by 1015 days.

(21) Appl. No.: 15/585,046

(22) Filed: May 2, 2017

(65) Prior Publication Data

US 2018/0320250 A1 Nov. 8, 2018

(51) Int. Cl.
*C22C 9/04* (2006.01)
*H01S 3/038* (2006.01)
*H01S 3/225* (2006.01)

(52) U.S. Cl.
CPC ............. *C22C 9/04* (2013.01); *H01S 3/0388* (2013.01); *H01S 3/2251* (2013.01)

(58) Field of Classification Search
CPC .......... C22C 9/04; H01M 4/00; H01S 3/0388; H01S 3/2251
See application file for complete search history.

(56) References Cited

U.S. PATENT DOCUMENTS

| | | | | |
|---|---|---|---|---|
| 5,637,160 A * | 6/1997 | Brock | ........................ | C22C 9/04 148/412 |
| 7,339,973 B2 * | 3/2008 | Morton | ................... | H01S 3/038 372/87 |
| 2008/0002752 A1 * | 1/2008 | Dyer | ................... | H01S 3/09713 372/55 |
| 2009/0263272 A1 * | 10/2009 | Uchida | ..................... | B22C 9/22 420/478 |
| 2012/0155501 A1 * | 6/2012 | Ferrasse | ................ | H01S 3/0388 148/564 |
| 2013/0329763 A1 * | 12/2013 | Kardokus | ................. | C22C 9/04 372/87 |

OTHER PUBLICATIONS

Saito et al. "Long lifetime operation of an ArF-excimer laser" (Year: 1996).*
Hisashi et al. "Mechanical Properties and Machinability of Extruded Cu-40%Zn Brass Alloys with Bismuth via Powder Metallurgy Process" (Year: 2009).*

(Continued)

*Primary Examiner* — Alexandra M Moore
(74) *Attorney, Agent, or Firm* — DiBerardino McGovern IP Group LLC (57) ABSTRACT

An electrode is formed of a bismuth brass alloy. The bismuth brass alloy contains about 30 weight percent to about 40 weight percent of zinc, about 1 weight percent to about 10 weight percent of bismuth, and the balance copper. The bismuth brass alloy has a microstructure that includes islands of bismuth dispersed within the base metal formed of copper and zinc and also includes bismuth at the grain boundaries of the base metal. As a large bulky atom with high resistivity against fluorine attack, bismuth segregates at the grain boundaries and blocks the fluorine diffusion into the lattice. In the presence of fluorine, the bismuth brass alloy forms a protective layer on the elongated surface of the body of the electrode. This protective layer inhibits reaction of the base metal formed of copper and zinc with fluorine and thereby preserves the surface of the electrode material.

19 Claims, 10 Drawing Sheets

(56) References Cited

OTHER PUBLICATIONS

Von Bergmann et al. "Design and Technology of Excimer Lasers"—Chapter 4 in Basting et al. "Excimer Laser Technology" (Year: 2005).*
"Microstructure and Properties of a Bismuth-Brass" He Bing Han, Xin Min Huang, Yu Cheng Qu, Yong Qiang Qin, Jun Li Cao Mar. 2012 Advanced Materials Research ISSN: 1662-8985, vol. 486 pp. 270-273. (Year: 2012).*
Metallography and Microstructures of Copper and Its Alloys. ASM Handbook, vol. 9. G.F. Vander Voort, editor, p. 775-788 DOI: 10.1361/asmhba0003772 (Year: 2004).*
Translation of Emelina et al the Effect of Bismuth and Lead on the structure formation of Experimental alloys based on the composition Cu-30% Zn during crystallization, deformation, and heat treatment (Year: 2023).*
Emelina et al the Effect of Bismuth and Lead on the structure formation of Experimental alloys based on the composition Cu-30% Zn during crystallization, deformation, and heat treatment (Year: 2010).*
K. Ahmed et al., "Particle-grain boundary interactions: A phase field study," Computational Materials Science 134 (2017) pp. 25-37.
Y. Kuo et al., "Effect of the Prior Particle Boundary on the Microstructure and Mechanical Properties of Hot-Isostatic-Pressed IN718 Alloy", Materials Transactions, vol. 58, No. 7 (2017) pp. 1042-1048.

* cited by examiner

ELECTRODES FOR LASER CHAMBERS HAVING EXTENDED LIFETIME

BACKGROUND

Pulsed laser light is used in a number of applications, e.g., in integrated circuit photolithography to expose photoresist on wafers by passing the light through a mask. This pulsed laser light can be generated using a gas discharge medium in a master oscillator (MO) chamber by providing gas discharge between a pair of electrodes at very high voltages in very short electrical discharges in the gas discharge medium.

If the gas discharge medium contains fluorine, e.g., in an ArF (argon fluoride) laser system, then a fluorine-containing plasma will be generated between the pair of electrodes during operation. Fluorine-containing plasmas are highly corrosive to metals. Consequently, the electrodes will corrode and erode over time during operation of the chamber. This corrosion and erosion of the electrodes eventually leads to beam quality (BQ) degradation. It is presently believed that the primary cause of BQ degradation is the nucleation and growth of localized zones of corrosion product build-up on the surface of the anode, which is typically made of brass. This localized corrosion product build-up, which is sometimes referred to as "reef formation" or "reefing", leads to non-uniformity in discharges between the electrodes and downstream arcing in the plasma.

Uniform electrode erosion-corrosion in plasma is a complex process involving many factors including plasma chemistry, gas purity, current density, voltage, discharge frequency, gas flow velocity, and the electrode's microstructure and post-processing treatment (hardness, annealing, grain structure, grain orientation, phase distribution, impurities, porosity, free energy of formation of fluorides, etc.). Corrosion reef formation appears to follow a nucleation and growth mechanism in that it only manifests itself after many billions of discharges. The spots at which reefing occurs on an electrode stick up into the plasma more so than the rest of the surface of the electrode. As such, reefing can cause arcing to occur in the plasma.

Arcing in the plasma is undesirable because it robs the laser chamber of energy because energy goes into the arc discharge rather than into the laser cavity. Thus when a significant amount of arcing occurs in the plasma, the electrodes must be replaced to keep the laser chamber operating efficiently. As such, reefing shortens the lifetime during which electrodes can be used effectively in a laser chamber.

To extend the effective life of electrodes in laser chambers, efforts have been made to minimize reef formation in the MO chambers by introducing a doping element to be used for the anode and cathode. In one such effort, brass alloys were doped with relatively small amounts (e.g., 100-300 ppm) of phosphorus (P). These P-doped electrodes have been found to exhibit lifetimes of about 30 billion pulses. Nevertheless, to further reduce the cost per pulse, longer electrode life, which will increase chamber life and reliability as well as reduce the down time needed for repairs, is still needed.

It is in this context that embodiments arise.

SUMMARY

In an example embodiment, an electrode is provided. The body of the electrode has an elongated surface formed of a bismuth brass alloy. The bismuth brass alloy contains about 30 weight percent to about 40 weight percent of zinc, about 1 weight percent to about 10 weight percent of bismuth, and the balance copper. Further, the bismuth brass alloy has a microstructure that includes islands of bismuth dispersed within a base metal formed of copper and zinc and also includes bismuth at the grain boundaries of the base metal formed of copper and zinc.

In one embodiment, the bismuth brass alloy contains about 3 weight percent to about 5 weight percent of bismuth. In one embodiment, the total amount of impurities in the bismuth brass alloy does not exceed about 5 ppm. In one embodiment, the bismuth brass alloy contains about 30 weight percent of zinc and about 3.25 weight percent of bismuth. In one embodiment, the bismuth brass alloy contains about 37 weight percent of zinc and about 3.25 weight percent of bismuth.

In one embodiment, the bismuth brass alloy consists essentially of about 30 weight percent to about 40 weight percent of zinc, about 1 weight percent to about 10 weight percent of bismuth, less than about 5 ppm of impurities, and the balance copper. In one embodiment, in the presence of fluorine, a protective layer forms on the elongated surface of the body of the electrode, and this protective layer inhibits reaction of the base metal formed of copper and zinc with fluorine.

In another example embodiment, an electrode having a protective layer is provided. The body of the electrode has an elongated surface formed of a bismuth brass alloy. The bismuth brass alloy consists essentially of about 30 weight percent to about 40 weight percent of zinc, about 1 weight percent to about 10 weight percent of bismuth, less than about 5 ppm of impurities, and the balance copper. The bismuth brass alloy has a microstructure that includes islands of bismuth dispersed within a base metal formed of copper and zinc and also includes bismuth at the grain boundaries of the base metal formed of copper and zinc. Bismuth, as a very fluorine-resistant alloy, blocks the diffusion of fluorine into the lattice. The elongated surface of the body of the electrode has a protective layer formed thereon. This protective layer is formed during exposure of the electrode to fluorine, e.g., when the electrode is used in a gas discharge laser chamber. The protective layer inhibits the reaction of the base metal formed of copper and zinc with fluorine.

Other aspects and advantages of the inventions will become apparent from the following detailed description, taken in conjunction with the accompanying drawings, which illustrate by way of example the principles of the inventions.

DETAILED DESCRIPTION

In the following description, numerous specific details are set forth in order to provide a thorough understanding of the exemplary embodiments. However, it will be apparent to one skilled in the art that the example embodiments may be practiced without some of these specific details. In other instances, process operations and implementation details have not been described in detail, if already well known.

Figure 1:
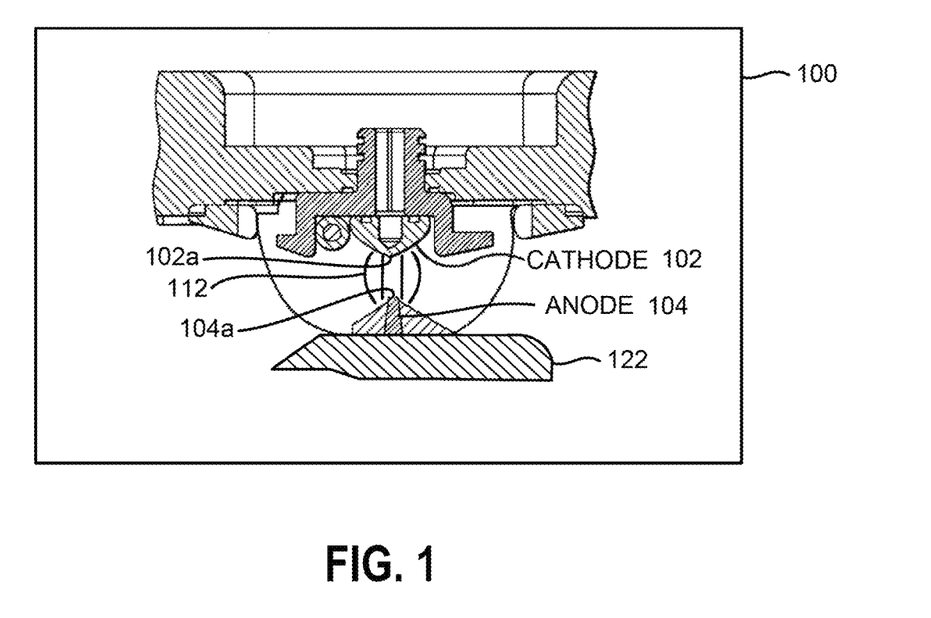
FIG. 1 is a cross-sectional view of a portion of the interior of a gas discharge laser chamber that shows the electrodes.

FIG. 1 is a cross-sectional view of a portion of the interior of a gas discharge laser chamber that shows the electrodes. As shown in FIG. 1, anode 104 is mounted on anode support bar 122, which is disposed within chamber 100. In one example, chamber 100 is a master oscillator (MO) chamber 100. The elongated anode surface 104a of anode 104 faces the elongated cathode surface 102a of cathode 102. The space between elongated anode surface 104a and elongated cathode surface 102a defines discharge area 112 within the laser chamber. In one embodiment, the length of each of cathode 102 and anode 104 is about 24 inches and the diameter of each electrode is about 0.5 inch. In one embodiment, the distance between elongated cathode surface 102a and elongated anode surface 104a is about 0.5 inch. Those skilled in the art will appreciate that the length and diameter of the electrodes and the distance between the electrodes may be varied to suit the needs of particular applications.

Figure 2:
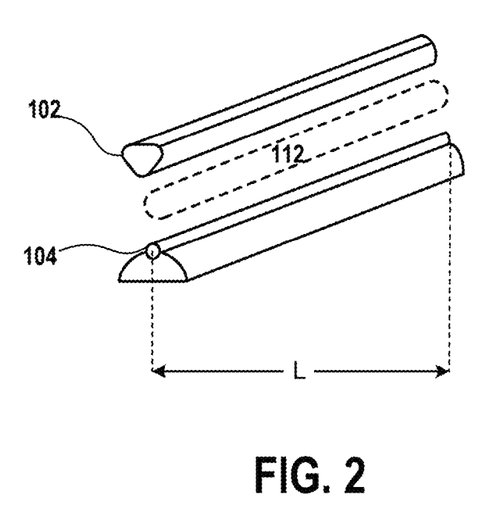
FIG. 2 is a schematic view that further illustrates how the electrodes are situated in a gas discharge laser chamber.

FIG. 2 is a schematic view that further illustrates how the electrodes are situated in a gas discharge laser chamber. As shown in FIG. 2, anode 104 and cathode 102 are disposed in an opposing relationship so that elongated cathode surface 102a faces elongated anode surface 104a. Anode 104 is mounted on anode support bar 122. Discharge area 112, which is the space defined between elongated anode surface 104a and elongated cathode surface 102a, typically has a width of about 0.5 inch. In one example, the length, L, of each of the anode 104 and the cathode 102 is about 24 inches. As noted above, the width of the discharge area and the length of the electrodes may be varied to suit the needs of particular applications.

Figure 3:
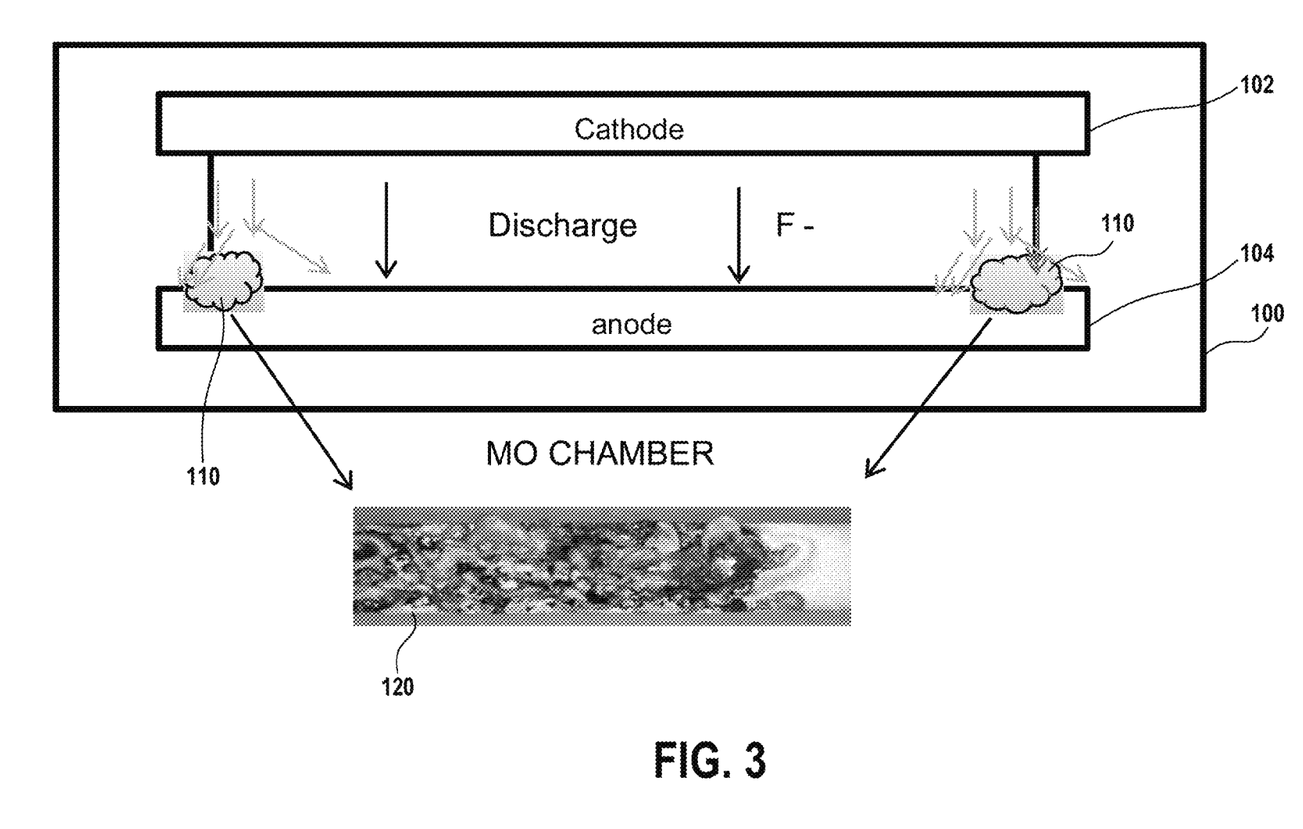
FIG. 3 is a schematic illustration of the formation of reef-like layers ("reefing") during operation of an ArF laser system.

FIG. 3 is a schematic illustration of the formation of reef-like layers ("reefing") during operation of an ArF laser system. In operation, fluorine (F) gas is present in MO chamber 100 between the cathode 102 and the anode 104 as discharge occurs between these electrodes. As fluorine ions (F—) attack the surface of the anode 104, corroded areas 110 are formed on the surface of the anode. The corroded areas 110 are reef-like layers and the actual visual appearance of the reef-like layers is shown in photomicrograph 120, which is included as part of FIG. 3. The visual appearance of the corroded areas 110, especially when viewed in color, resembles that of a coral reef commonly found in tropical ocean waters. It is for this reason that the corroded areas 110 are referred to as "reef-like" layers or "reef spots" and the formation of these layers or spots is referred to as "reefing."

The reef-like layers (corroded areas 110) formed on the surface of anode 104 are non-conductive and uneven in that they stick up into the plasma more so than the rest of the anode surface. During discharge, the fluorine ions (F—) are attracted to conductive areas rather than non-conductive areas. Thus, the fluorine ions become localized on the anode surface in the areas immediately surrounding the non-conductive, reef spots. This localized concentration of fluorine ions, in combination with the increased height of the reef spots relative to the anode surface, causes arcing to occur in the plasma. Arcing robs the laser chamber of energy because energy goes into the arc discharge instead of the laser cavity. When significant arcing occurs due to reef spots on the anode surface, it is necessary to replace the electrodes to keep the laser chamber operating efficiently. As such, to increase the lifetime during which electrodes can be used in laser chambers, the continuous formation and growth of reef spots on the anode surface must be suppressed or eliminated. Evidence shows that reefing occurs when fluorine penetrates into the grain boundaries and diffuses inside the lattice and reacts with the brass.

To resist the formation and growth of reef spots, it was conceived to formulate an electrode material that forms a passivation layer when exposed to fluorine. More particularly, it was conceived to formulate an alloy which contains one or more elements within the alloy matrix that would react with fluorine and form a layer on the top surface of the layer. This passivation layer would inhibit the reaction of fluorine with the base metal and thereby preserve the underlying base metal from being attacked by fluorine. For such a passivation layer to be suitable for use within a gas discharge laser chamber, the passivation layer should be substantially uniform, relatively smooth, and have a thickness that is thin enough so that the passivation layer does not significantly impair the conductivity of the electrode. If the passivation layer is relatively thick, the passivation layer can not only impair the conductivity of the electrode but also become fragile and unstable and crack off from the electrode from thermal shock.

Figure 4A:
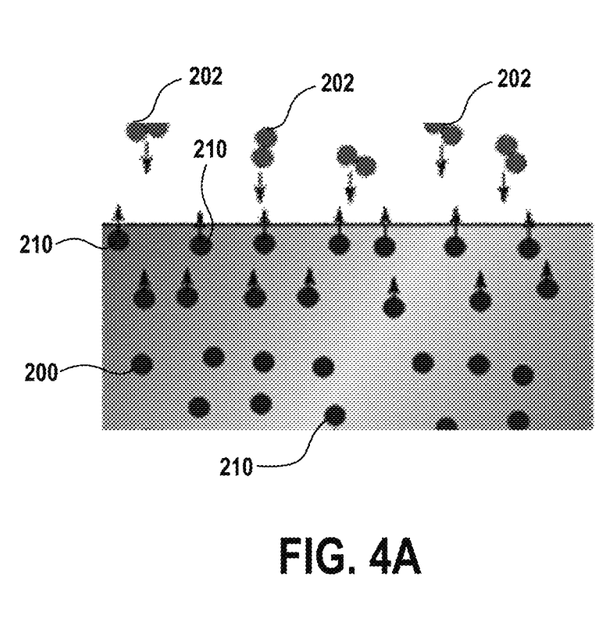
FIGS. 4A and 4B schematically illustrate the formation of a passivation layer on an electrode material during operation of a gas discharge laser chamber.
Figure 4B:
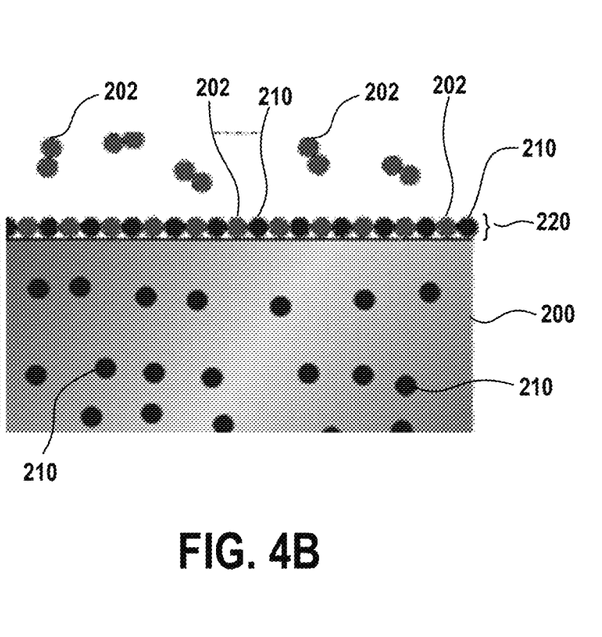

FIGS. 4A and 4B schematically illustrate the formation of a passivation layer on an electrode material during operation of a gas discharge laser chamber. As shown in FIG. 4A, base metal 200 includes alloying elements 210 dispersed therein. As fluorine ions 202 move toward the top surface of base metal 200, alloying elements 210 migrate toward the top surface of the base metal and react with the fluorine ions. The reaction between the alloying elements 210 and the fluorine ions 202 results in the formation of passivation layer 220, which is shown in FIG. 4B. Those skilled in the art will appreciate that the fluorine ions 202 also will react with the constituent elements of base metal 200. However, for ease of illustration, passivation layer 200 is shown in FIG. 4B to be the result of the reaction between only fluorine ions 202 and alloying elements 210. The presence of passivation layer 220 protects the base metal 200 by inhibiting the reaction between fluorine ions 202 and the base metal, as will be explained in more detail below.

It has been discovered that bismuth (Bi) can be used an alloying addition to increase the resistance of brass electrodes to the corrosion that occurs in gas discharge laser chambers. This is a surprising result because bismuth (Bi) was initially not considered to be a viable candidate because it has an unusually high electrical resistance for a metal and, consequently, might adversely impact the high electrical conductivity of brass electrodes. Relative to phosphorus (P), which is used in P-doped brass electrodes, bismuth has a higher melting point (about 84% higher). Bismuth is also about 80% harder than phosphorus so that it can harden and embrittle the brass lattice. Bismuth does not form fluorides readily and, as it is a big bulky atom, its presence along grain boundaries could be advantageous against fluorine. Grain boundaries strongly influence the properties and behavior of materials during operation. Grain boundary energy, mobility, diffusivity, cohesive strength, and sliding resistance—all of which depend upon local structure and chemistry—determine bulk material behavior and properties such as corrosion, strength, and conductivity. It is believed that bismuth does preferentially segregate to grain boundaries in copper-zinc (brass) alloys. The presence of bismuth at the grain boundaries in copper-zinc alloys blocks or significantly reduces the fluorine diffusion along the boundaries, whereas bismuth is typically considered to be an embrittling agent in copper (Cu).

It is also believed that bismuth interacts directly with vacancies in the brass lattice and pins them, thus preventing the vacancies from agglomerating into larger void pockets. This pinning of vacancies makes it difficult for fluorine to diffuse into brass because vacancy motion facilitates the diffusion of fluorine (or any atom) through the brass lattice. Restricted vacancy motion will also have a tendency to suppress the overall level of self-diffusion of zinc and copper within the brass, as well as metal ion movement out of the electrode. It is further believed that the reduction in electrical conductivity in copper and brass caused by the addition of bismuth might have an effect on the current driving the electromigration type effects that occur in brass electrodes during operation of the laser chamber.

In one embodiment, an electrode material contains about 30 weight percent to about 40 weight percent of zinc, about 1 weight percent to about 10 weight percent of bismuth, and the balance copper. As used herein, the term "about" means that the stated amount can be varied within an acceptable range of tolerance, e.g., plus or minus 10 percent. In one embodiment, the amount of bismuth contained in the electrode material is within a range from about 3 weight percent to about 5 weight percent. In one embodiment, the base metal of the electrode material is brass which contains about 30 weight percent zinc and the balance copper (referred to as "cartridge brass") In another embodiment, the base metal of the electrode material is brass which contains about 37 weight percent zinc and the balance copper (referred to as "Muntz Metal brass").

Figure 5:
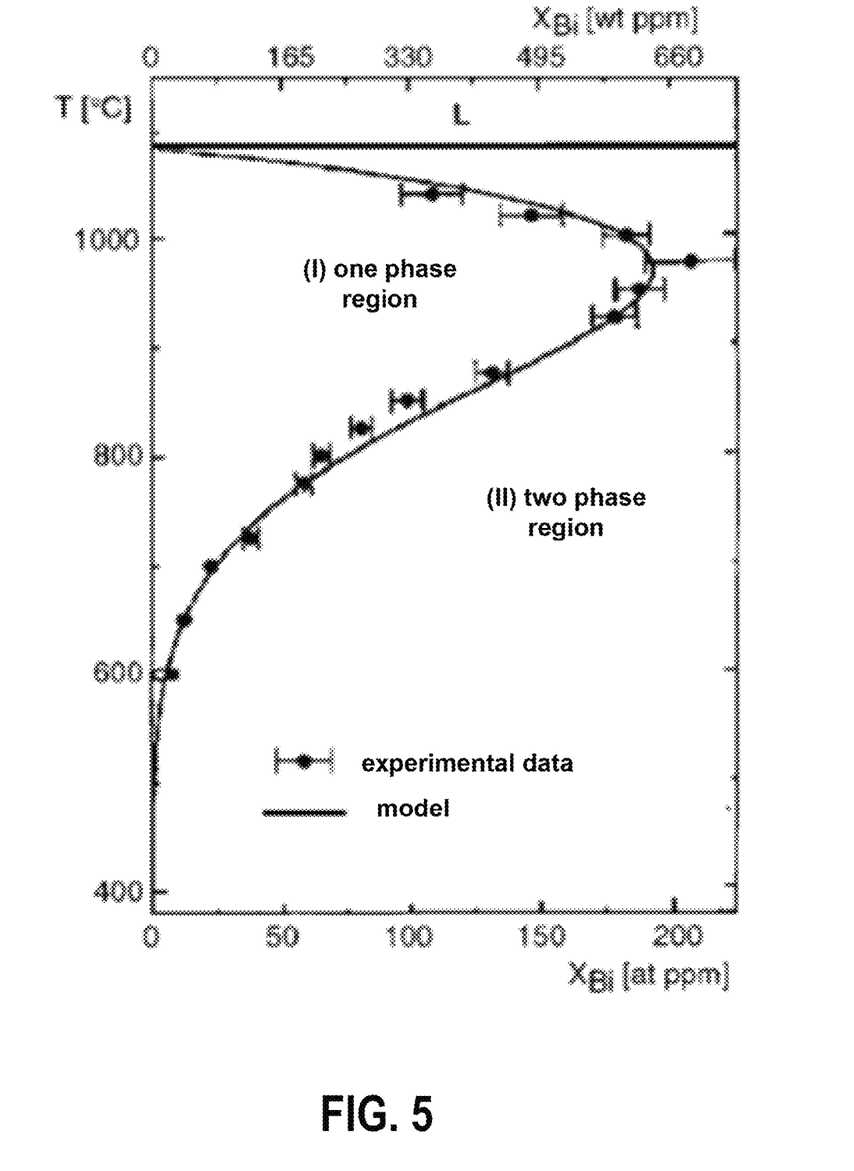
FIG. 5 is a graph that shows the solidus line of the Bi—Cu phase diagram.

FIG. 5 is a graph that shows the solidus line of the Bi—Cu phase diagram. As can be seen in FIG. 5, bismuth is very insoluble in copper at 750 degrees Celsius. The maximum of 10 weight percent of bismuth has been selected to avoid a large reduction in the conductivity of the brass, which might harm the performance of electrodes made of the bismuth brass alloy electrode material.

The electrode material can be prepared in accordance with well-known techniques for manufacturing brass alloys. However, the electrode material should be prepared in a manner that yields a high purity material. In one embodiment, the electrode material contains no more than about 5 ppm of impurities. One reason for this high purity level is that elemental impurities can react with fluorine and form into a gas or vapor phase which is not desirable to have in the laser chamber. For example, if silicon (Si) is present in the electrode material as an impurity, this silicon can react with fluorine and form silicon tetrafluoride ($SiF_4$) gas the presence of which is highly undesirable because it poisons the gaseous environment within the laser chamber.

As bismuth is relatively insoluble in copper-zinc (brass) alloys, the microstructure of the electrode material is characterized by, among other features, the presence of islands of bismuth homogeneously dispersed within the base metal of the copper-zinc alloy. The microstructure of the electrode material also includes bismuth at the grain boundaries of the base metal, as described in more detail below with reference to FIGS. 7 and 8. The electrode material can be forged to eliminate the voids and annealed to improve the uniformity with which the islands of bismuth are dispersed within the base metal and to remove the residual stress and lattice mismatch remaining from forging. The grain size does not seem to play a significant role in the final alloy performance.

Figure 6A:
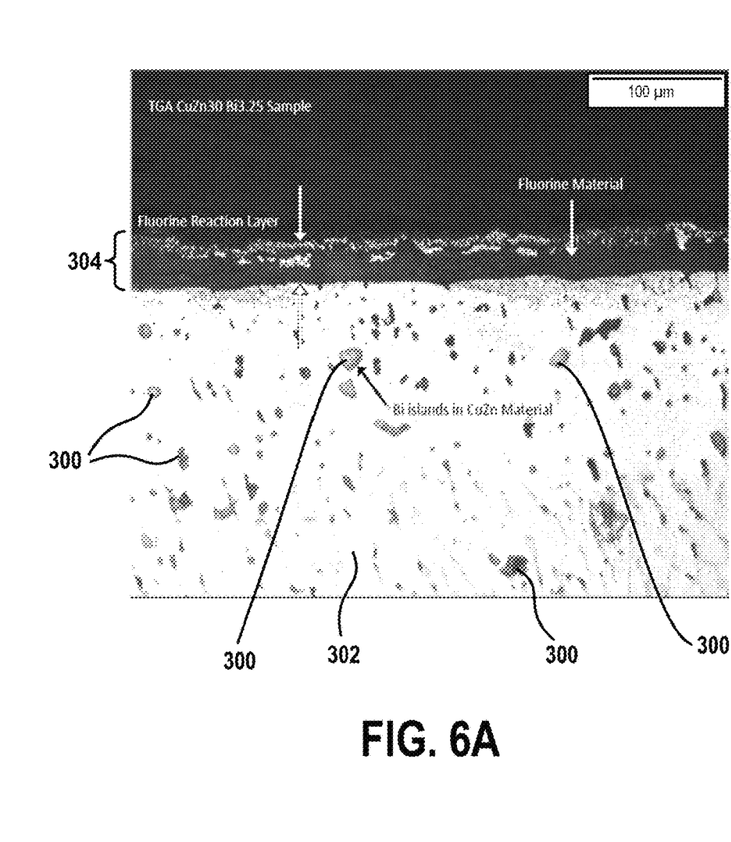
FIG. 6A is a photomicrograph of a cross-section of a bismuth brass electrode sample with the scale bar (100 μm) shown in the upper right hand corner.

FIG. 6A is a photomicrograph of a cross-section of a bismuth brass electrode sample with the scale bar (100 μm) shown in the upper right hand corner. The composition of the bismuth brass electrode sample shown in FIG. 6A is 30 weight percent zinc, 3.25 weight percent bismuth, and the balance copper, with the material containing less than 5 ppm of impurities. As can be seen in FIG. 6A, the bismuth brass electrode sample includes islands 300 of bismuth homogeneously dispersed within the copper-zinc base metal 302. As discussed above, the reason for this is that bismuth is relatively insoluble in the copper-zinc base metal and therefore bismuth exists in the material as a separate phase. The bismuth brass electrode sample was subjected to dynamic thermal fluoridation-thermo gravimetric analysis (TGA) testing in which the sample was heated up to about 750 degrees Celsius in a furnace and exposed to a 1% fluorine atmosphere for about 2 hours to allow a fluoridation reaction to take place. By raising the temperature, thermal fluoridation attempts to re-create the action of the plasma. Plasma can enhance the effective reactivity of gases by hundreds of degrees. An example would be the deposition of silicon (Si) from silane. By straight thermal methods (chemical vapor deposition (CVD)), a temperature of 900 degrees Celsius would be required. If plasma is added (plasma enhanced chemical vapor deposition (PECVD)), the reaction temperature drops down to 250 degrees Celsius. Thermal fluoridation is re-creating the plasma action by using a temperature of 750 degrees Celsius. The plasma is always there, so thermal fluoridation would be representative of the normal chemical reactions of the electrode with the fluorine plasma during normal chamber life.

Figure 6B:
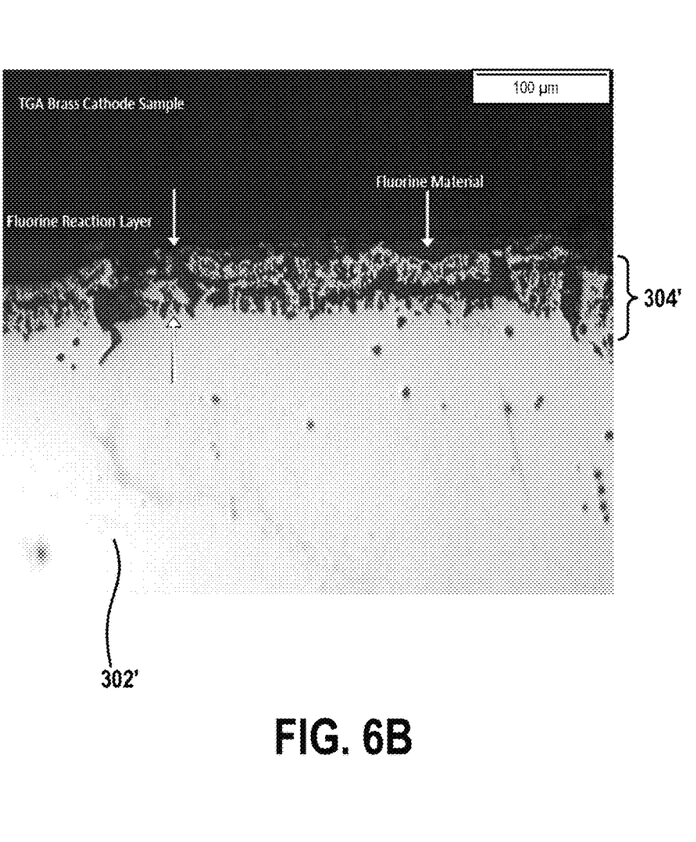
FIG. 6B is a photomicrograph of a cross-section of a brass electrode sample with the scale bar (100 μm) shown in the upper right hand corner.

This type of thermal fluoridation testing simulates the fluoridation conditions to which an electrode material is subjected over the course of months of real-life use in a gas discharge laser chamber in just a few hours of testing. During the thermal fluoridation testing, the surface of the bismuth brass electrode material reacted with the fluorine and this reaction resulted in the formation of a layer 304 which protected the electrode material from being further attacked by the fluorine and thereby preserved the surface of the electrode material. It is believed that one of the primary reasons that layer 304 forms during exposure to fluorine is that bismuth is relatively insoluble in copper-zinc (brass) alloys. The layer 304 acts as a protective coating layer that significantly inhibits the penetration of fluorine into the underlying copper-zinc base metal 302. It is further believed that layer 304, which contains copper fluoride ($CuF_2$), zinc fluoride ($ZnF_2$), and a small amount of bismuth trifluoride ($BiF_3$), functions as an effective protective coating layer because bismuth reacts with fluorine at a much slower rate than either copper or zinc react with fluorine. The presence of bismuth trifluoride in the layer 304 is believed to harden and embrittle the layer so that it remains stable and does not get too thick before it cracks off from thermal shock. It appears that the bismuth-containing alloys FIG. 6B is a photomicrograph of a cross-section of a brass electrode sample with the scale bar (100 μm) shown in the upper right hand corner. The composition of the brass electrode sample shown in FIG. 6B is 30 weight percent zinc and the balance copper (referred to as "cartridge brass"). This brass electrode sample was subjected to the same dynamic thermal fluoridation-thermo gravimetric analysis (TGA) testing to which the bismuth brass electrode sample shown in FIG. 6A was subjected. As can be seen in FIG. 6B, the copper-zinc base metal 302' does not include any separate phases dispersed therein such as, for example, the bismuth islands 300 shown in FIG. 6A, because the cartridge brass material includes only copper and zinc. The surface appears to have a great deal of interconnected porosity. A highly porous surface, especially when filled with brittle metal fluorides, is quite likely to exfoliate under conditions of thermal shock. The rapid pulsing (e.g., 4 kHz to 6 kHz) of the high density current in excimer lasers is likely to produce high thermal shock in short bursts over extremely long periods of time. During the thermal fluoridation testing, the surface of the brass electrode material reacted with the fluorine and this reaction resulted in the formation of a layer 304'. In contrast with layer 304 shown in FIG. 6A, however, layer 304' does not inhibit the reaction of fluorine with the copper-zinc base metal 302' and therefore layer 304' extends further into the base metal with the result that the surface of the electrode material is not preserved. Porosity distributed along the grain boundaries has the potential of creating pockets where fluorine can penetrate the depth of the material and contribute to erosion (in this context, via an exfoliation mechanism where the material lifts off along corroded grain boundaries).

Figure 7:
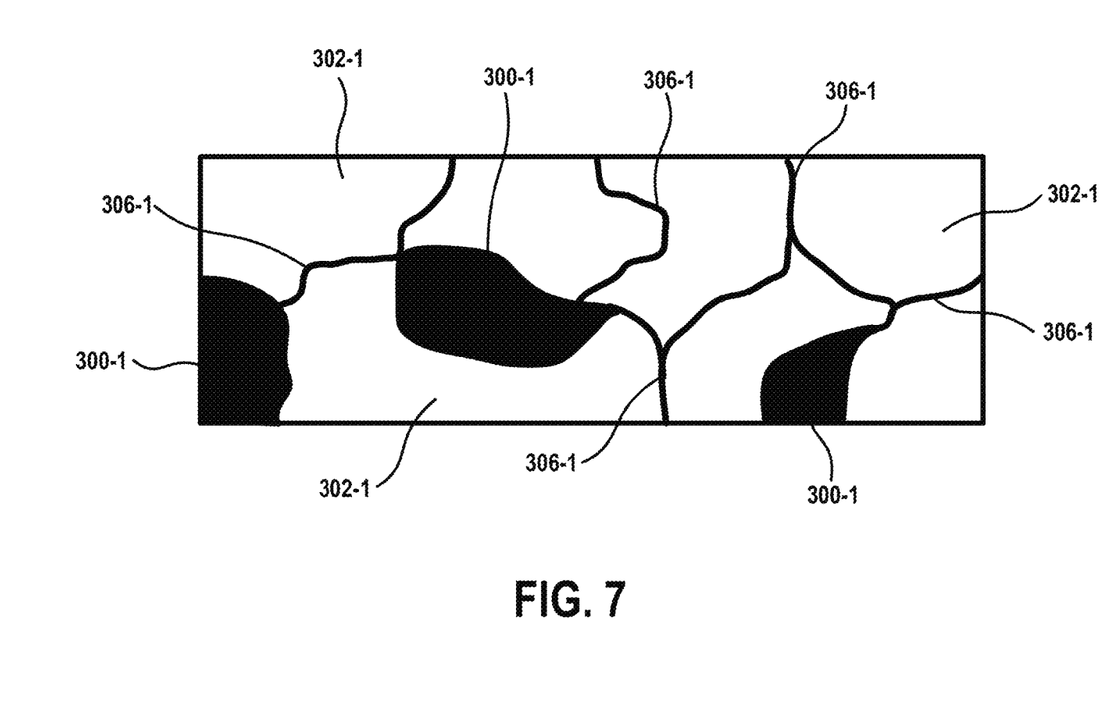
FIG. 7 is an illustration that shows an example microstructure of the bismuth brass electrode.

As mentioned above, in addition to islands of bismuth, the microstructure of the bismuth brass electrode material also includes bismuth at the grain boundaries of the base metal of copper and zinc. FIG. 7 is an illustration that shows an example microstructure of the bismuth brass electrode. As shown in FIG. 7, individual grains of the copper-zinc (brass) base metal 302-1 are defined by grain boundaries 306-1. Islands of bismuth 300-1, which are homogeneously dispersed throughout the copper-zinc base metal 302-1, are formed within the grains of the base metal. Bismuth is also present at the grain boundaries 306-1. As described above, the presence of bismuth at the grain boundaries in copper-zinc alloys blocks or significantly reduces the fluorine diffusion along the boundaries.

Figure 8:
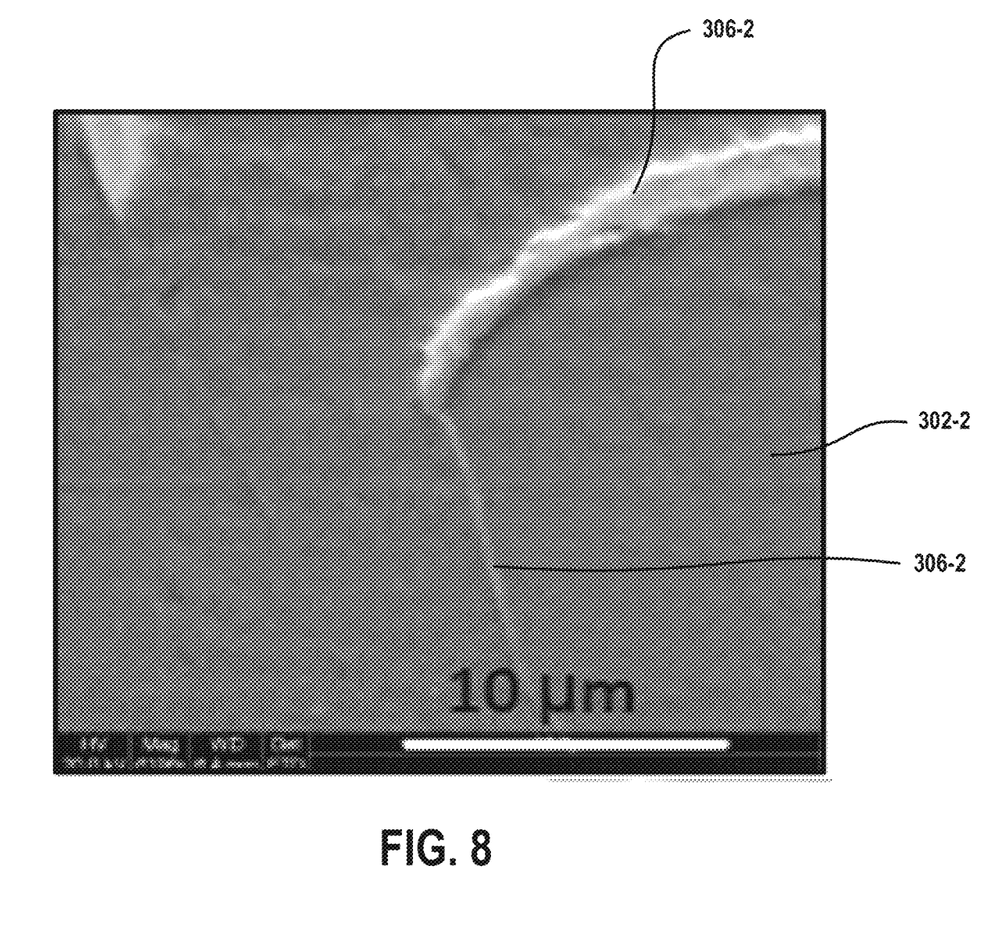
FIG. 8 is a scanning electron microscope (SEM) image of an experimental sample of bismuth brass electrode material with the scale bar (10 μm) shown along the bottom edge of the image.

FIG. 8 is a scanning electron microscope (SEM) image of an experimental sample of bismuth brass electrode material with the scale bar (10 μm) shown along the bottom edge of the image. The experimental sample of the bismuth brass electrode material was treated (800 degrees Celsius, 16 hours) and etched before the SEM image was taken. As shown in FIG. 8, bismuth (the white areas in the image) has diffused into the grain boundaries 306-2 of the copper-zinc (brass) base metal 302-2. This segregation of bismuth, which is a very fluorine-resistant alloy, at the grain boundaries blocks the diffusion of fluorine into the lattice.

Figure 9:
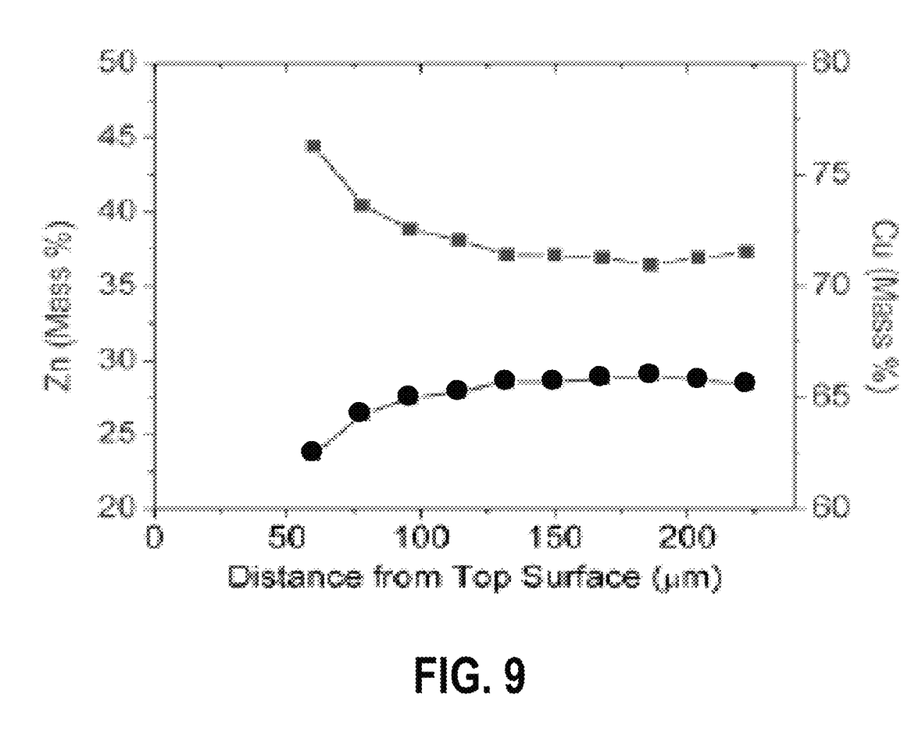
FIG. 9 is a graph that shows zinc (Zn) content and copper (Cu) content for a P-doped brass alloy sample as a function of the distance from the top surface of the sample.

It is believed that one of the root causes of corrosion on brass alloys is dezincification. If the resistance of a brass electrode material to reefing scales with zinc (Zn) content, gradual dezincification could limit the lifetime of the electrode, e.g., the anode. FIG. 9 is a graph that shows zinc (Zn) content (●) and copper (Cu) content (■) for a P-doped brass alloy sample as a function of the distance from the top surface of the sample. The P-doped brass alloy TGA sample was contacted with fluorine at 750 degrees Celsius which, as noted above, essentially re-creates plasma action within a chamber and therefore can be used to assess resistance to run-away corrosion in electrodes within plasma. The cross-section results shown in the graph of FIG. 9 demonstrate that zinc depletion occurs close to the top surface which reflects a dezincification phenomenon. The data points plotted in the graph of FIG. 9 are listed in Table 1.

TABLE 1

| Distance (microns) | Cu (mass %) | Zn (mass %) |
|---|---|---|
| 60 | 76.28 | 23.72 |
| 78 | 73.65 | 26.35 |
| 96 | 72.54 | 27.46 |
| 114 | 72.08 | 27.87 |
| 132 | 71.41 | 28.55 |
| 150 | 71.4 | 28.56 |
| 168 | 71.27 | 28.73 |
| 186 | 70.96 | 29.01 |
| 204 | 71.27 | 28.65 |
| 222 | 71.54 | 28.43 |

Figure 10:
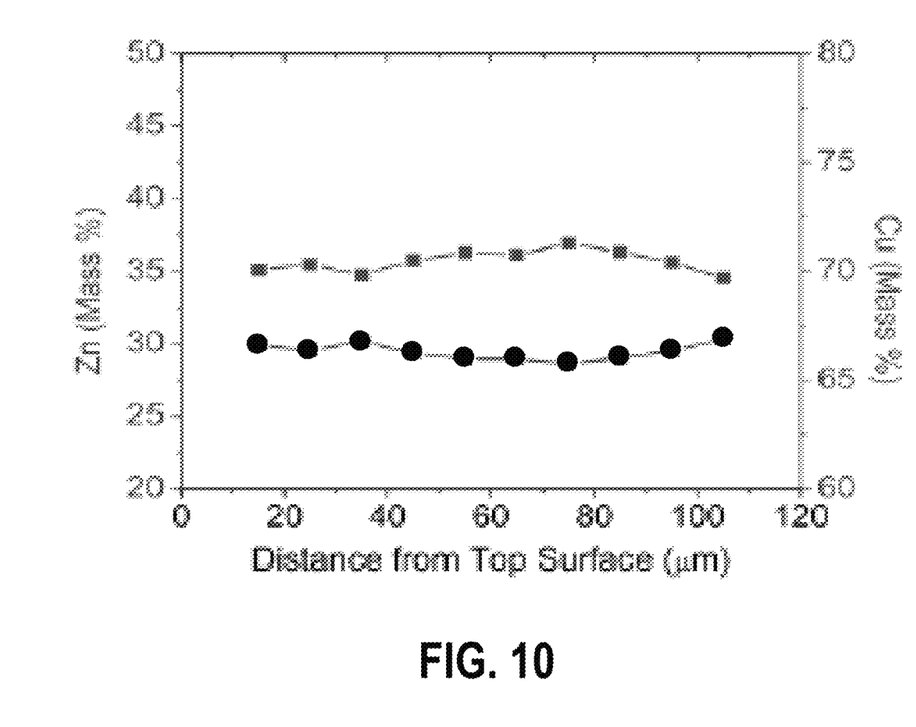
FIG. 10 is a graph that shows zinc (Zn) content and copper (Cu) content for a bismuth brass alloy sample as a function of the distance from the top surface of the sample.

FIG. 10 is a graph that shows zinc (Zn) content (●) and copper (Cu) content (■) for a bismuth brass alloy sample as a function of the distance from the top surface of the sample. The bismuth brass alloy sample (Cu—Zn 30-Bi 3.25 wt. %) was contacted with fluorine at 750 degrees Celsius to assess resistance to run-away corrosion in electrodes within plasma. The cross-section results shown in the graph of FIG. 10 reveal that the level of zinc is roughly the same with depth (the data points plotted in the graph of FIG. 10 are listed in Table 2). Thus, there is no evidence of dezincification in the bismuth brass alloy sample. This supports the theory of bismuth segregation which blocks inward diffusion of fluorine, blocks outward diffusion of zinc, and eliminates dezincification.

TABLE 2

| Distance (microns) | Cu (mass %) | Zn (mass %) |
|---|---|---|
| 15 | 70.09 | 29.91 |
| 25 | 70.32 | 29.54 |
| 35 | 69.85 | 30.15 |
| 45 | 70.51 | 29.37 |
| 55 | 70.85 | 28.95 |
| 65 | 70.74 | 28.98 |
| 75 | 71.30 | 28.67 |
| 85 | 70.88 | 29.04 |
| 95 | 70.42 | 29.53 |
| 105 | 69.70 | 30.29 |

The same dynamic thermal fluoridation-thermo gravimetric analysis (TGA) testing procedure described above was used to compare the corrosion rates observed for 1) a P-doped brass alloy (with the brass alloy containing 30 weight percent zinc and the balance copper), 2) a first bismuth brass alloy containing 3.25 weight percent of bismuth, 30 weight percent of zinc, and the balance copper (with the impurity level being no more than 5 ppm), and 3) a second bismuth brass alloy containing 3.25 weight percent of bismuth, 37 weight percent of zinc, and the balance copper (with the impurity level being no more than 5 ppm). For purposes of this comparison, the corrosion rate was determined by weighing the electrode material samples before and after exposure to fluorine to determine the amount of weight gain resulting from the exposure to fluorine. The electrode material sample made of the P-doped brass alloy was found to have a corrosion rate of about 4.6 mg/cm$^2$, whereas each of the electrode material samples formed of the first and second bismuth brass alloys was found to have a corrosion rate of about 0.5 mg/cm$^2$. Thus, the corrosion rates for each of the first and second bismuth brass alloys reflect a 99% improvement relative to the corrosion rate for the P-doped brass alloy.

The improved corrosion rates for bismuth brass electrodes is evidence of a significantly longer lifetime (maybe up to 60 billion pulses or more) for bismuth brass electrodes as compared to P-doped brass electrodes. Additional details regarding P-doped brass electrodes are set forth in U.S. Pat. No. 9,246,298 B2, the disclosure of which is incorporated by reference herein for all purposes.

Accordingly, the disclosure of the example embodiments is intended to be illustrative, but not limiting, of the scope of the inventions, which are set forth in the following claims and their equivalents. Although example embodiments of the inventions have been described in some detail for purposes of clarity of understanding, it will be apparent that certain changes and modifications can be practiced within the scope of the following claims. In the following claims, elements and/or steps do not imply any particular order of operation, unless explicitly stated in the claims or implicitly required by the disclosure.

What is claimed is:

1. An electrode comprising
a body having an elongated surface formed of a bismuth brass alloy, the bismuth brass alloy consisting of 30 weight percent of zinc, 1 weight percent to 10 weight percent of bismuth, and the balance copper, and the bismuth brass alloy having a microstructure that includes islands of bismuth dispersed within a base metal formed of copper and zinc and also includes bismuth at the grain boundaries of the base metal formed of copper and zinc, wherein a total amount of impurities contained in the bismuth brass alloy does not exceed 5 ppm.

2. A laser system, comprising:
a chamber;
a cathode disposed within the chamber, the cathode having an elongated body surface; and
an anode, a body of the anode having an elongated surface formed of a bismuth brass alloy, the bismuth brass alloy consisting of 30 weight percent to 40 weight percent of zinc, 1 weight percent to 10 weight percent of bismuth, less than 5 ppm of impurities, and the balance copper.

3. The laser system of claim 2, wherein the bismuth brass alloy contains 3 weight percent to 5 weight percent of bismuth.

4. The laser system of claim 2, wherein the bismuth brass alloy contains 30 weight percent of zinc and 3.25 weight percent of bismuth.

5. The laser system of claim 2, wherein the bismuth brass alloy contains 37 weight percent of zinc and 3.25 weight percent of bismuth.

6. A laser system, comprising:
a chamber;
a cathode disposed within the chamber, the cathode having an elongated body surface; and
an anode, a body of the anode having an elongated surface formed of a bismuth brass alloy, the bismuth brass alloy consisting of 30 weight percent to 40 weight percent of zinc, 1 weight percent to 10 weight percent of bismuth, and the balance copper, and the bismuth brass alloy having a microstructure that includes islands of bismuth dispersed within a base metal formed of copper and zinc and also includes bismuth at the grain boundaries of the base metal formed of copper and zinc, wherein a total amount of impurities contained in the bismuth brass alloy does not exceed 5 ppm.

7. The laser system of claim 6, wherein the bismuth brass alloy contains 3 weight percent to 5 weight percent of bismuth.

8. The laser system of claim 6, wherein the bismuth brass alloy contains 30 weight percent of zinc and 3.25 weight percent of bismuth.

9. The laser system of claim 6, wherein the bismuth brass alloy contains 37 weight percent of zinc and 3.25 weight percent of bismuth.

10. A laser system, comprising:
a chamber;
a cathode disposed within the chamber, the cathode having an elongated body surface; and
an anode, a body of the electrode having an elongated surface formed of a bismuth brass alloy, the bismuth brass alloy consisting of 30 weight percent to 40 weight percent of zinc, 1 weight percent to 10 weight percent of bismuth, less than 5 ppm of impurities, and the balance copper, the bismuth brass alloy having a microstructure that includes islands of bismuth dispersed within a base metal formed of copper and zinc and also includes bismuth at the grain boundaries of the base metal formed of copper and zinc, and the elongated surface of the body of the anode having a protective layer formed thereon, the protective layer inhibiting reaction of the base metal formed of copper and zinc with fluorine.

11. The laser system of claim 10, wherein the bismuth brass alloy contains 3 weight percent to 5 weight percent of bismuth.

12. The laser system of claim 10, wherein the bismuth brass alloy contains 30 weight percent of zinc and 3.25 weight percent of bismuth.

13. The laser system of claim 10, wherein the bismuth brass alloy contains 37 weight percent of zinc and 3.25 weight percent of bismuth.

14. A gas discharge laser chamber comprising
an electrode body situated in the gas discharge laser chamber, the electrode body having an elongated surface formed of a bismuth brass alloy, the bismuth brass alloy consisting of 30 weight percent to 40 weight percent of zinc, 1 weight percent to 10 weight percent of bismuth, and the balance copper, and the bismuth brass alloy having a microstructure that includes islands of bismuth dispersed within a base metal formed of copper and zinc and also includes bismuth at the grain boundaries of the base metal formed of copper and zinc, wherein a total amount of impurities contained in the bismuth brass alloy does not exceed 5 ppm.

15. A laser system, comprising:
a chamber;
a cathode disposed within the chamber, the cathode having an elongated body surface; and
an anode, a body of the anode having an elongated surface formed of a bismuth brass alloy, the bismuth brass alloy consisting of 30 weight percent to 37 weight percent of zinc, 1 weight percent to 10 weight percent of bismuth, and the balance copper, and the bismuth brass alloy having a microstructure that includes islands of bismuth dispersed within a base metal formed of copper and zinc and also includes bismuth at the grain boundaries of the base metal formed of copper and zinc, wherein a total amount of impurities contained in the bismuth brass alloy does not exceed 5 ppm.

16. A laser system, comprising:
a chamber;
a cathode disposed within the chamber, the cathode having an elongated body surface; and
an anode, a body of the anode having an elongated surface formed of a bismuth brass alloy, the bismuth brass alloy consisting of 30 weight percent to 40 weight percent of zinc, 1 weight percent to 10 weight percent of bismuth, less than 5 ppm of impurities, and the balance copper, the bismuth brass alloy having a microstructure that includes islands of bismuth dispersed within a base metal formed of copper and zinc and also includes bismuth at the grain boundaries of the base metal formed of copper and zinc, the body being capable of forming a protective layer on the elongated surface of the body of the anode in the presence of fluorine, the protective layer inhibiting reaction of the base metal formed of copper and zinc with fluorine.

17. The laser system of claim 16, wherein the bismuth brass alloy contains 3 weight percent to 5 weight percent of bismuth.

18. The laser system of claim 16, wherein the bismuth brass alloy contains 30 weight percent of zinc and 3.25 weight percent of bismuth.

19. The laser system of claim 16, wherein the bismuth brass alloy contains 37 weight percent of zinc and 3.25 weight percent of bismuth.

\* \* \* \* \*